United States Patent
Gaddala (10) Patent No.: US 8,645,478 B2
(45) Date of Patent: Feb. 4, 2014

(54) SYSTEM AND METHOD FOR MONITORING SOCIAL ENGINEERING IN A COMPUTER NETWORK ENVIRONMENT

(75) Inventor: Satish Kumar Gaddala, Karnataka (IN)

(73) Assignee: McAfee, Inc., Santa Clara, CA (US)

( * ) Notice: Subject to any disclaimer, the term of this patent is extended or adjusted under 35 U.S.C. 154(b) by 1057 days.

(21) Appl. No.: 12/634,945

(22) Filed: Dec. 10, 2009

(65) Prior Publication Data

US 2013/0246537 A1 Sep. 19, 2013

(51) Int. Cl.
*G06F 15/16* (2006.01)

(52) U.S. Cl.
USPC ...... 709/206; 709/224; 709/217; 379/207.02; 379/142.01; 713/152

(58) Field of Classification Search
USPC ............ 709/206, 203, 224, 217; 379/142.01, 379/207.02; 713/152
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,744,867 B1 * | 6/2004 | Chin et al. | 379/142.01 |
| 6,968,364 B1 * | 11/2005 | Wong et al. | 709/217 |
| 7,257,773 B1 | 8/2007 | Jagger | |
| 7,359,941 B2 | 4/2008 | Doan | |
| 7,506,155 B1 * | 3/2009 | Stewart et al. | 713/152 |
| 7,565,403 B2 | 7/2009 | Horvitz | |
| 7,580,982 B2 | 8/2009 | Owen | |
| 7,581,254 B2 | 8/2009 | Edwards | |
| 7,673,315 B1 * | 3/2010 | Wong et al. | 725/51 |
| 7,769,815 B2 * | 8/2010 | Wang et al. | 709/206 |
| 7,899,866 B1 * | 3/2011 | Buckingham et al. | 709/206 |
| 7,912,910 B2 * | 3/2011 | Banerjee et al. | 709/206 |
| 7,933,396 B2 * | 4/2011 | Chin et al. | 379/207.02 |
| 7,979,881 B1 * | 7/2011 | Wong et al. | 725/51 |
| 8,244,861 B2 * | 8/2012 | Belali et al. | 709/224 |

* cited by examiner

*Primary Examiner* — Tammy Nguyen
(74) *Attorney, Agent, or Firm* — Patent Capital Group (57) ABSTRACT

A method in one example implementation includes providing a memory component with one or more alternative email entries associated with a plurality of name records. The name records represent one or more authorized users of a network. The method further includes determining whether any of the one or more alternative email entries corresponds to a sender email address in an incoming email message, where the incoming email message is being sent from the sender email address to at least one official email address associated with the network. In more specific embodiments the method includes tagging the incoming email message with a first or second flag depending on whether any of the one or more alternative email entries corresponds to the sender email address and whether a username of the sender email address includes an identifiable portion of one of the plurality of name records.

14 Claims, 5 Drawing Sheets

SYSTEM AND METHOD FOR MONITORING SOCIAL ENGINEERING IN A COMPUTER NETWORK ENVIRONMENT

TECHNICAL FIELD

This disclosure relates in general to the field of security and, more particularly, to monitoring social engineering in a computer network environment.

BACKGROUND

The ability of individual persons and organizations to protect confidential information has become increasingly important, and yet complicated, in today's society. The Internet has enabled interconnection of different computer networks all over the world. It provides a medium for sending electronic mail (i.e., email) between different users connected to different computer networks. Protecting confidential information has been made especially difficult due to an ever-changing array of social engineering tactics using the Internet, and particularly using email over the Internet. Social engineering includes any attempt to manipulate persons into divulging sensitive information (e.g., personal information, financial information, computer security data, work-related confidential information, etc.). Thus, social engineers rely on people, rather than computer security holes, to obtain sensitive information through mediums such as email, Internet, or phone.

Examples of social engineering tactics that rely on email include "phishing", "spoofing", and "pharming" scams. Phishing and spoofing include scams that combine social engineering tactics with email. Phishing includes the process of attempting to acquire information such as usernames, passwords, or financial information by masquerading as a legitimate and trustworthy entity in an electronic communication such as email. For example, an email may purport to be from a bank, a social website, or online payment processors. Such emails often direct recipients to enter sensitive information into a seemingly legitimate website that is actually a sham. Spoofing may occur when certain properties of an email message, such as the "FROM" field in the message header, have been altered to make it appear as if it came from a different source. Thus, the recipient may be tricked into believing that the email was sent from a legitimate source, and thereby, reveal sensitive information. Other social engineering schemes are continuously being devised with a common goal of using technology to manipulate users into divulging sensitive information. Security professionals and network administrators should attempt to manage social engineering tactics that make it difficult to distinguish between legitimate and bogus requests for information.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes providing a memory component with one or more alternative email entries associated with a plurality of name records. The plurality of name records represents one or more authorized users of a network. The method further includes determining whether any of the one or more alternative email entries corresponds to a sender email address in an incoming email message, where the incoming email message is being sent from the sender email address to at least one of a plurality of official email addresses associated with the network. In other more specific embodiments the method includes identifying a recipient email address in an outgoing email message from the network if a username of the recipient email address includes an identifiable portion of one of the plurality of name records, where the outgoing email message is being sent from one of the official email addresses to the recipient email address. In this specific embodiment, the memory component is populated with a new alternative email entry corresponding to the identified recipient email address. In another more specific embodiment the method includes tagging the incoming email message with a first or second flag depending on whether any one of the one or more alternative email entries in the memory component corresponds to the sender email address and whether a username of the sender email address includes an identifiable portion of one of the plurality of name records.

Example Embodiments

Figure 1:
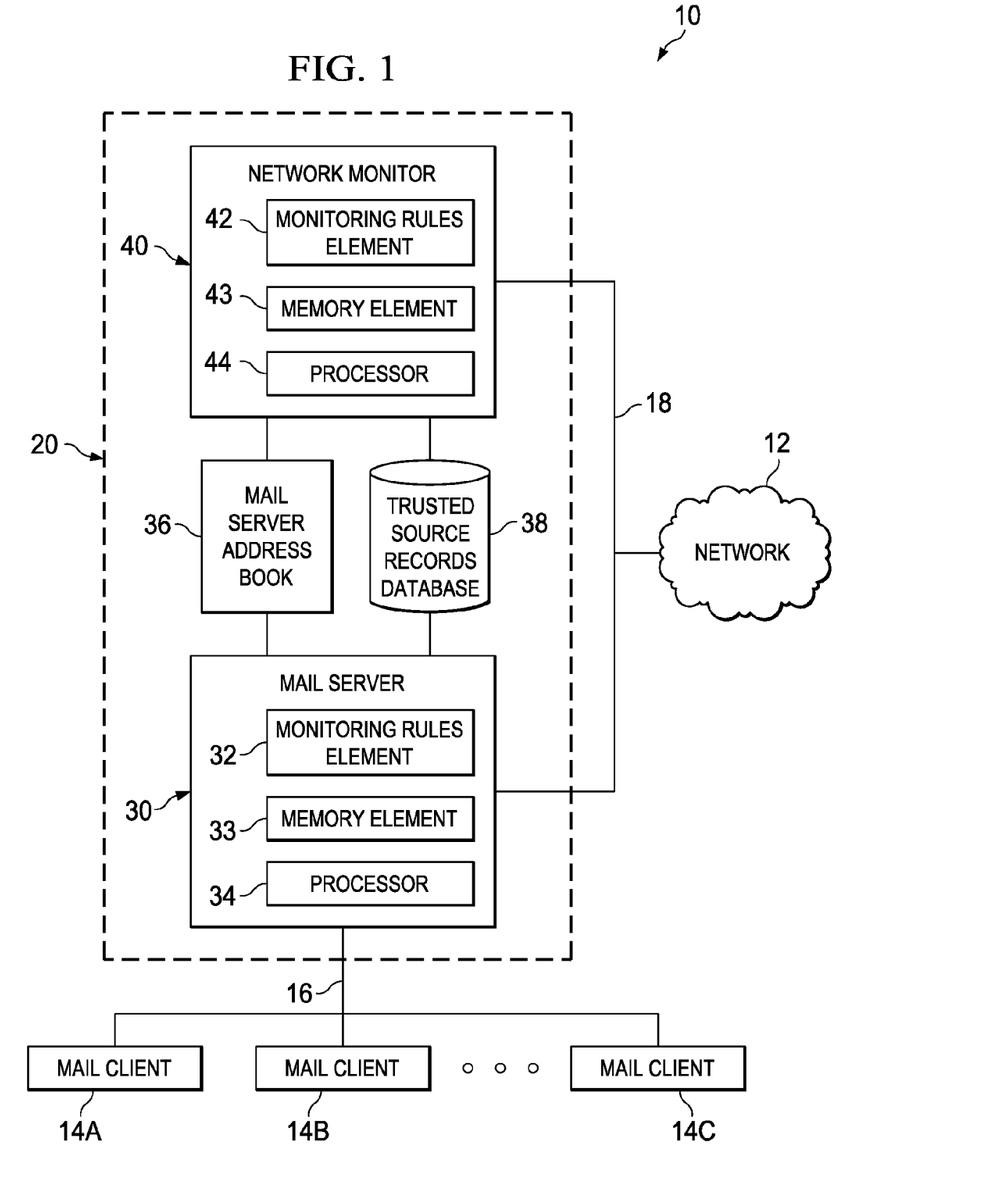
FIG. 1 is a simplified block diagram of a system for monitoring social engineering in a computer network environment in accordance with one embodiment.

FIG. 1 is a simplified block diagram of one embodiment of a system 20 for monitoring social engineering in a computer network environment 10. In network environment 10, one or more networks 12 are operably coupled to mail server 30, which is configured to communicate over network 12. A plurality of mail clients 14a, 14b, and 14c may also be operably coupled to mail server 30 and network 12. Within network environment 10 is system 20, which includes a mail server address book 36 and a trusted source records database (TSRD) 38 operably connected to mail server 30 and a network monitor 44. Network monitor 44 may have a monitoring rules element 42, a memory element 43, and a processor 44 and may be configured to monitor electronic communications between mail server 30 and network 12. Not shown in FIG. 1 is additional hardware that may be suitably coupled to processors 34 and 44 in the form of memory management units (MMU), additional symmetric multiprocessing (SMP) elements, physical memory, Ethernet, peripheral component interconnect (PCI) bus and corresponding bridges, small computer system interface (SCSI)/integrated drive electronics (IDE) elements, etc. It will be appreciated that any suitable operating systems will also be configured in mail server 30 and network monitor 40 to appropriately manage the operation of hardware components therein.

In example embodiments system 20 may be used by an organization to monitor each outgoing email message to determine if a recipient email address or identification ("email ID") on the outgoing email message is a valid personal email ID of someone within the organization. If it determines that the recipient email ID is a valid personal email ID, then an email entry corresponding to the valid personal email ID is added to TSRD 38. System 20 also monitors each incoming email message to determine whether a sender email ID is a valid personal email ID of a person within the organization, and the incoming email messages are then handled accordingly, by marking, flagging, deleting, rerouting, or the like. It will be apparent to those in the art that a valid "personal email ID" could include any alternative email ID that is not associated with the organization's network, such as, for example, email IDs from anonymous email services like yahoo, gmail, hotmail, and the like, email IDs from another organization's domain, any email ID from an alternative domain and/or host, etc.

For purposes of illustrating the techniques of system 20, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments employed by organizations often include the ability to communicate electronically with other networks, using, for example, email messages sent across the Internet. These environments provide a breeding ground for social engineers to devise ways of contacting employees or members of an organization in an attempt to extract sensitive data of the organization or of the particular employee or member being contacted. While this disclosure may hereinafter reference employees, employers, and companies, it will be appreciated that the broad scope of this disclosure also applies to any type of organization providing electronic communication with other networks and individuals for its associated members.

Social engineering may be divided into two main categories: 1) computer or technology-based deception and 2) human-based deception. The technology-based approach deceives a user into believing a legitimate computer system is requesting sensitive information, so that the user willingly reveals the sensitive information. For example, a pop-up window may appear on the user's computer screen indicating that the computer has had a problem and the user will need to re-authenticate with an id and password. Once the user provides an id and password, the creator of the pop-up window will be able to access the user's network. The human-based approach deceives the user by taking advantage of the user's lack of knowledge and natural desire to be helpful and to please others. For example, a user may receive a telephone call from someone purporting to be Information Technology support personnel, requesting id and password information in order to resolve a particular network or system problem. In this situation, many users may yield to their natural desire to be helpful and provide the requested information.

Of particular concern are social engineering tactics that utilize both the technology-based approach and the human-based approach. Email communication is one way in which social engineers can make use of both approaches. Email addresses or IDs are made up of two main parts separated by an "@" sign, having the following format: Username@Hostname.DomainName. The username typically identifies the person to whom the email id is assigned. The hostname, if used, may refer to a particular server on a network, and the domain name identifies the Internet address of the user's email account. Many users take advantage of multiple email accounts, including an email account provided by an employer and one or more personal email accounts through, for example, anonymous email services such as Yahoo, Gmail, Hotmail, and the like. Employers typically create usernames with some variation of each employee's name. For example, usernames may include combined first and last names, last names and first initials of first names, etc. Thus, when a first employee receives an email from a second employee, the first employee is able to identify the sender from the email id username. Anonymous email services, which may be offered at no cost, allow each customer to create a unique username, without any verification of the customer's real or legal identity. Thus, any customer may anonymously create any username (provided it is not already being used in that particular email service), which can be an arbitrary word or name or even another individual's legal name. For ease of reference, "email address" and "email identification" may also be referred to herein as "email ID" or simply "ID".

One social engineering scheme takes advantage of personal email accounts and an employee's inability to differentiate between genuine personal email IDs of other employees and fraudulent personal email IDs created for social engineering attacks. In this particular scheme, a social engineer may create a personal email account through an anonymous email service with a username containing the legal name of a senior level employee of Company A. The social engineer could then use this personal email account to contact employees beneath the senior level employee, masquerading as the senior level employee and requesting sensitive information, such as, for example, human resources data or proprietary marketing strategy data of Company A. Because the personal email ID includes the legal name of the senior level employee at Company A, the email message could appear to be sent from a genuine personal email account of the senior level employee. Thus, an employee receiving the email message may be easily deceived into believing the email to be sent from a legitimate personal email account. Even if the employee is suspicious regarding the source of the email, the employee may be reluctant to question the request if it contains the name of an employee in a more senior position within Company A.

A system for monitoring social engineering attempts, as outlined in FIG. 1, can minimize the success of such schemes that rely on an employee's inability to distinguish between genuine personal email ids and fraudulent personal email IDs. In accordance with one example implementation, a system is provided to create and update a trusted source records database to include mapped entries to genuine personal email ids of employees within a company. Incoming emails to employees within the company are scanned to determine whether the sender email id is a valid personal email id of an employee within the company. If the sender email id is a genuine personal email id, then the email message is marked accordingly and forwarded to the indicated recipient's electronic mailbox. If, however, the email is not authenticated as a genuine personal email id, then the email message may be deleted, rerouted, or marked accordingly and forwarded to the indicated recipient's electronic mailbox. Thus, system 20 provides information to users regarding the source of particular email messages, giving users the ability to make more informed decisions about providing sensitive data requested in such email messages.

Note that in computing, an executable (file) can cause a computer to perform indicated tasks according to encoded instructions, as opposed to a file that only contains data. Files that contain instructions for an interpreter may be considered 'executables' or 'binaries' in contrast to program source code. The more generic term 'object' (as used herein in this Specification) is meant to include any such executables, binaries, kernel modules, etc., which are sought to be invoked, initiated, or otherwise executed.

Turning to the infrastructure of FIG. 1, network 12 may be configured as one or more networks and may be configured in any form including, but not limited to, local area networks (LANs) and wide area networks (WANs) such as the Internet. In one embodiment, mail server 30 and mail clients 14a, 14b and 14c may be operably coupled to network 12 (e.g., the Internet) by an Internet Service Provider (ISP) or through an Internet Server with dedicated bandwidth. The connection between mail clients 14a, 14b, and 14c and network 12 may include any appropriate medium such as, for example, digital subscriber lines (DSL), telephone lines, T1 lines, T3 lines, wireless, satellite, fiber optics, cable, Ethernet, etc. or any combination thereof. In addition, gateways, routers and the like may be used to facilitate electronic communication between mail clients 14a, 14b, and 14c and network 12. The ISP or Internet Server and mail server 30 may be configured to allow mail clients 14a, 14b, and 14c to communicate with other nodes on the Internet using Transmission Control Protocol/Internet Protocol (TCP/IP) and to send and receive email messages using Simple Mail Transfer Protocol (SMTP). In this example embodiment, system 20 may be implemented in an IT Headquarters of a company, with mail clients 14a, 14b, and 14c being end user computers operated by individual employees of the company. The end user computers may include desktops, laptops, or mobile or handheld computing devices (e.g., personal digital assistants (PDAs) or mobile phones) or any other computing device capable of receiving and sending electronic mail messages. It should be noted that the network configurations and interconnections shown and described herein are for illustrative purposes only. One of ordinary skill in the art will appreciate that FIG. 1 is intended as an example and should not be construed to imply architectural limitations in the present disclosure.

In the example embodiment shown in FIG. 1, mail server address book 36 may be a corporate address book containing valid corporate email addresses used to communicate within the corporate network and to communicate with individuals or organizations in other networks. Mail server address book 36 may be configured using a particular protocol or platform such as, for example, Lightweight Directory Access Protocol (LDAP), Active Directory®, Lotus® Domino® Directory, etc. Mail server address book 36 may include name records with first and last names of employees within the organization and possibly a middle name or middle initial. In addition, the name records corresponding to employee names may be associated with official corporate email ids. Entries in TSRD 38 may be configured to include name entries with first and last names of employees and possibly a middle name or middle initial. TSRD 38, however, may also be populated with valid personal email ids mapped to a corresponding name entry, as outgoing email messages are continuously monitored for new valid personal email ids. Although example embodiments for automatically creating and updating TSRD 38 are described herein, it will be apparent to those in the art that TSRD 38 could alternatively be manually created and updated.

One implementation of network monitor 40 includes configuring a Data Loss Prevention (DLP) monitor or a Web-Proxy, to scan for email traffic from network 12. A rule to monitor recipient email IDs of outgoing email messages could be added to monitoring rules element 42. Monitoring rules element 42 of network monitor 40 may continuously monitor outgoing email messages from mail server 30 to determine whether the outgoing email messages contain a recipient email id that is a valid personal email id. This may be accomplished by comparing a username of a recipient email id of an outgoing email message with official name records in mail server address book 36. If the username of the recipient email id matches a name record in mail server address book 36, then network monitor 40 may populate TSRD 38 with the recipient email id and map it to a corresponding name entry.

Monitoring rules element 32 of mail server 30 may be configured to continuously monitor incoming email messages from network 12 to determine whether the incoming email message contains a sender email id that is an authenticated personal email id or an unauthorized personal email id. This may be accomplished by comparing the sender email id to email entries in TSRD 38. If the sender email id is not found in TSRD 38, then the sender email id may be compared to name records in mail server address book 36 to determine whether the sender email id could appear to belong to someone listed in mail server address book 36. Monitoring rules element 32 may then tag the incoming email messages accordingly, so that a flag may be set in the recipient email id user's inbox to alert the user regarding the sender email id. Alternatively, monitoring rules element 32 could be configured to delete, reroute, or otherwise handle unauthorized incoming email messages.

Figure 2:
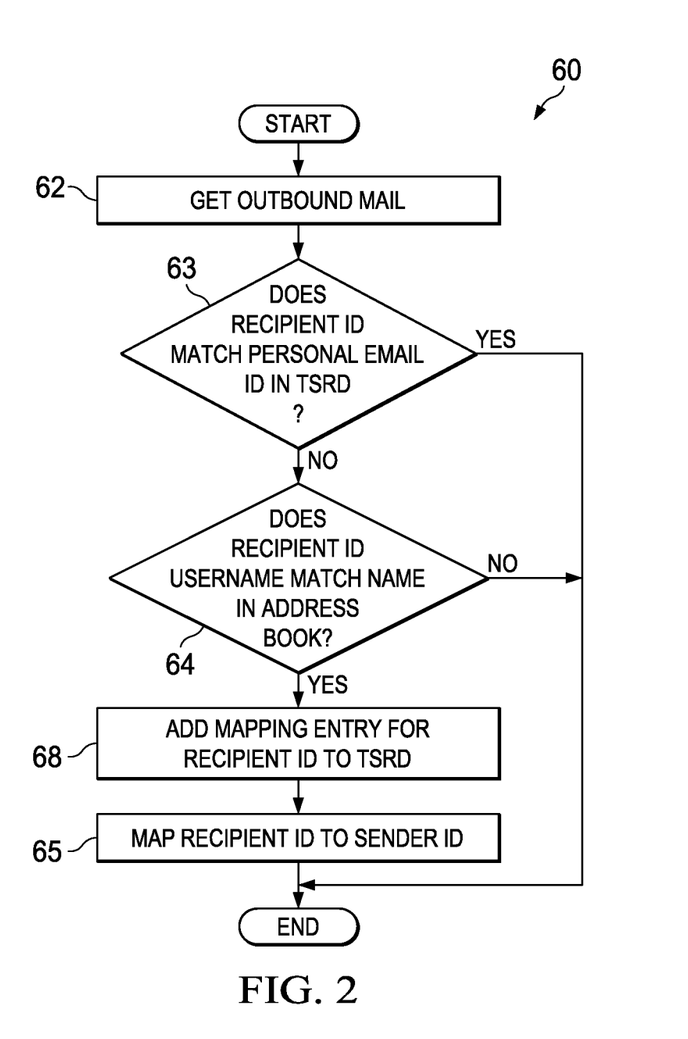
FIG. 2 is a simplified flowchart illustrating a series of example operations of a process associated with the system in accordance with one embodiment of the present disclosure.

Turning to FIG. 2, a simplified flowchart 60 is depicted illustrating a process associated with one implementation for monitoring social engineering in a computer network environment. The process involves monitoring outgoing email messages in order to populate TSRD 38 with authenticated personal email IDs belonging to persons within the company network. The process may be implemented in network monitor 40 as shown in FIG. 1, which may or may not be integrated with mail server 30, or may be implemented in any other suitable architecture. Monitoring rules element 42 in network monitor 40 may be configured to perform the process shown in FIG. 2.

The process may begin at step 62, where network monitor 40 gets outgoing email messages. Outgoing email messages may include any email messages being sent from an official company email ID (e.g., email ID stored in mail server address book 36) to an email ID that is not within the company network (e.g., email ID not stored in mail server address book 36). It will be apparent that if mail server 30 is shared by different organizations, then mail server address book 36 will associate stored email IDs with their particular organization or will distinguish email IDs based on organization in any other suitable way. After network monitor 40 receives an outgoing email message, a query is made in operation 63 of whether the recipient email ID matches a personal email ID stored in TSRD 38. If the recipient email ID matches a stored personal email ID, then the process ends because the recipient email ID has previously been authenticated as a valid personal email ID and already has a mapped email entry in TSRD 38. If, however, the recipient email ID does not match any personal email IDs stored in TSRD 38, then a comparison process is performed and a query is made in operation 64, to determine if the recipient email ID username matches a name record in mail server address book 36. If the recipient email ID username does not match any name record in mail server address book 36, then the process ends and TSRD 38 is not updated, because the recipient email ID has not been authenticated as a valid personal email ID. However, if the recipient email ID username matches a name record in mail server address book 36, then TSRD 38 is updated with an email entry for the recipient email ID in operation 68, and the email entry may be mapped to a name entry in TSRD 38 that corresponds to the matched name record from mail server address book 36.

One embodiment of the process of flowchart 60 includes operation 65 to map the recipient email ID to the sender email ID after TSRD 38 is updated. In this embodiment, the recipient email ID and sender email ID are correlated in order to track a savvy social engineer within a company. In one example scenario, a social engineer within a company may create a personal email ID using a name of another employee within the same company. The social engineer may then send an email message to the personal email ID from his/her own official company email ID, thereby effectively authenticating the personal email ID such that monitoring rules element 42 of network monitor 40 adds an email entry for the personal email ID in TSRD 38 and then maps the email entry to a corresponding name entry. However, in this described embodiment, the recipient email ID is also mapped to the sender email ID, providing the company with readily available information to determine the identity of the social engineer should he/she use the personal email ID to try to induce employees into revealing confidential company data or personal information.

As will be appreciated, the comparison process of operation 64, comparing an email id username to a valid first and last name from mail server address book 36, could be crafted in any number of ways. The operation could also be tailored to accommodate many different variations in usernames such as 1) first and last name, 2) first initial of first name and last name, 3) first initial of first and middle names and last name, 4) partial first name and full last name, etc. and any order of the possible variations. For example, a social engineer creating a phony email ID in order to masquerade as "Karen M. Jones" might create usernames such as KarenJones, KarenJones1, KarenMJones, Karen.Jones, Karen-Jones, KMJones, JonesKaren, JonesKar, etc.

One example comparison process could be performed by selecting each unique last name in mail server address book 36 and, beginning with the first character of the username in the email id being evaluated, comparing the sequential characters in the unique last name to the same number of sequential characters in the username. If a match is not found, the unique last name is compared to the same number of sequential characters in the username beginning with the second character of the username. Further comparisons may be made by shifting one character to the right in the username each time until either a match is found or all of the characters in the username have been included in at least one comparison without finding a match. If a match is found, however, then each of the first names associated with the unique last name could be compared to the remaining unmatched characters in the username in the same or similar manner. In addition, if no matches are found to any of the first names associated with the unique last name, then the remaining unmatched characters in the username could be compared to each of the first and second initials associated with the unique last name. Also, it will be apparent that the comparisons could be performed beginning with the last character of the username and shifting to the left until a match is found. In addition, the comparison process could be configured to identify a match with a fewer number of characters than an entire last name. For example, a match could be identified if at least the first five characters of a last name matched five sequential characters in the username. Although one embodiment of a comparison process has been described, any number of alternative parameters and methods could be configured in a comparison process. Thus, any alternative comparison process that identifies matches between name records and email ID usernames, such that TSRD 38 is properly populated with valid personal email IDs, could be used.

Figure 3:
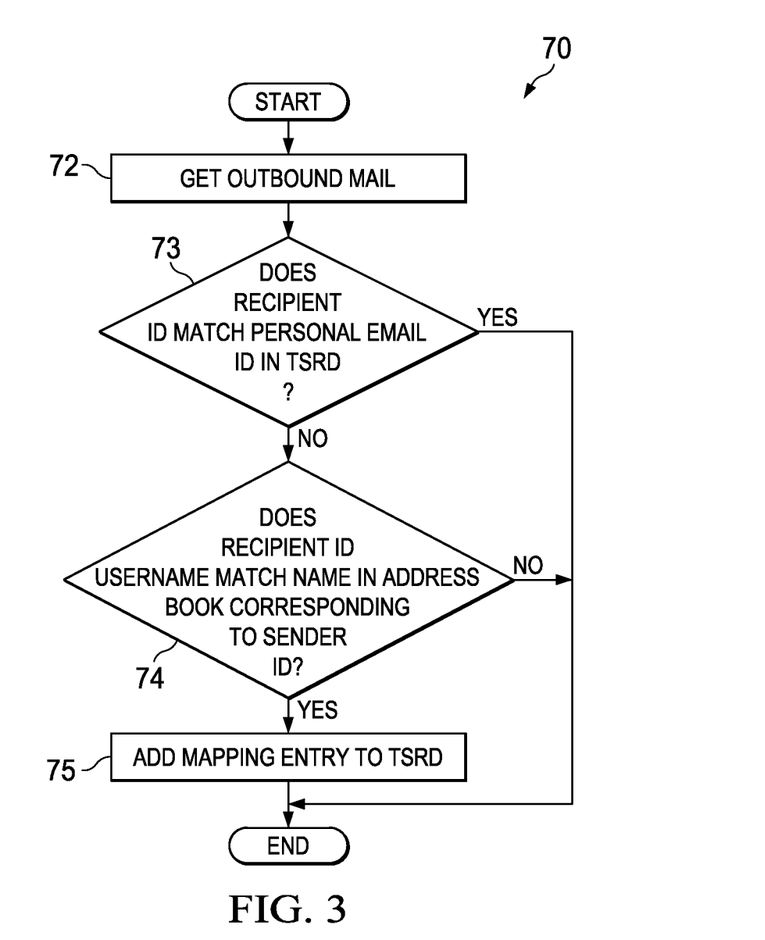
FIG. 3 is a simplified flowchart illustrating a series of example operations of a process associated with the system in accordance with an alternative embodiment of the present disclosure.

Turning to FIG. 3, a simplified flowchart 70 is depicted illustrating another embodiment of a process associated with monitoring outgoing email messages in order to populate TSRD 38 with authenticated personal email IDs. The process may include operation 72 and decision 73, which perform substantially similar functions to operation 62 and decision 63 shown in flowchart 60 of FIG. 2. In FIG. 3, however, if the recipient email ID does not match an email entry in TSRD 38 in operation 73, then a comparison process is performed and a query is made in operation 74, to determine if the recipient email ID username matches a name record in mail server address book 36 that corresponds to the sender email ID. If the recipient email ID username does not match the name record corresponding to the sender email ID, then the process ends and the recipient email ID is not added to TSRD 38, and thereby not authenticated. However, if the recipient email ID username matches the name record corresponding to the sender email ID, then TSRD 38 is updated with an email entry for the recipient email ID in operation 75, and the email entry may be mapped to a name entry in TSRD 38 that corresponds to the matched name record from mail server address book 36.

In the embodiment shown in FIG. 3, recipient email IDs are only authenticated as personal email IDs and added to TSRD 38 when an employee sends an email message from his/her official company email ID to his/her own personal email ID. This prevents a savvy social engineer within the company network from being able to update TSRD 38 with a personal email ID that appears to belong to another employee within the same company. In this embodiment, TSRD 38 would only be updated when an email message was sent to an employee's personal email ID from the same employee's official company email ID. It will be appreciated that the comparison process to compare the recipient email ID username to the name record from mail server address book 36 corresponding to the sender email ID, could be implemented in the same or similar manner as the comparison process previously described herein.

Figure 4A:
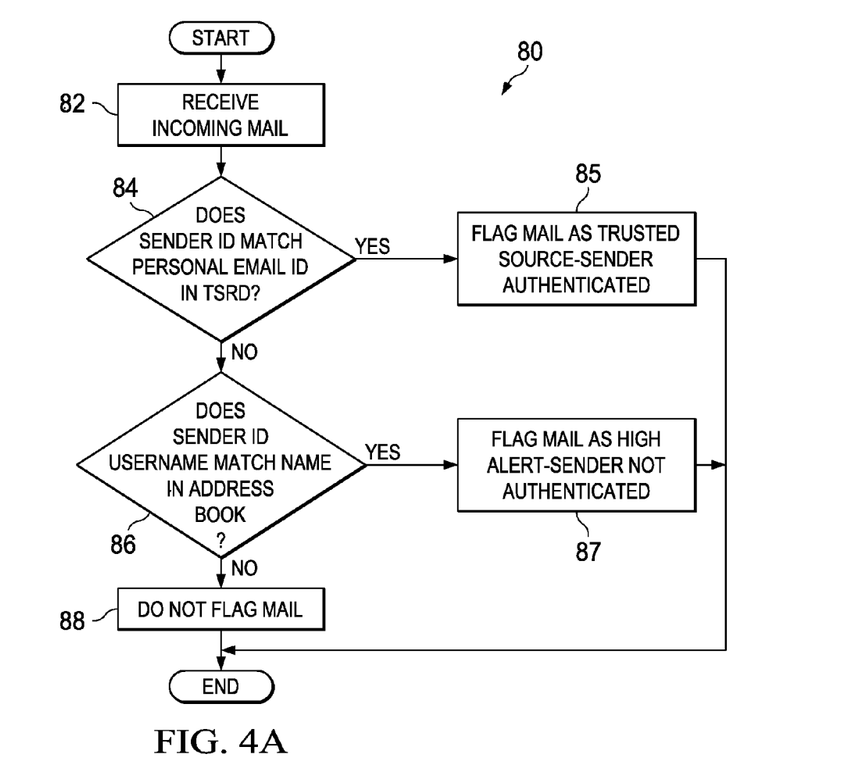
FIG. 4A is a simplified flowchart illustrating a series of example operations of another process associated with the system in accordance with one embodiment of the present disclosure.
Figure 4B:
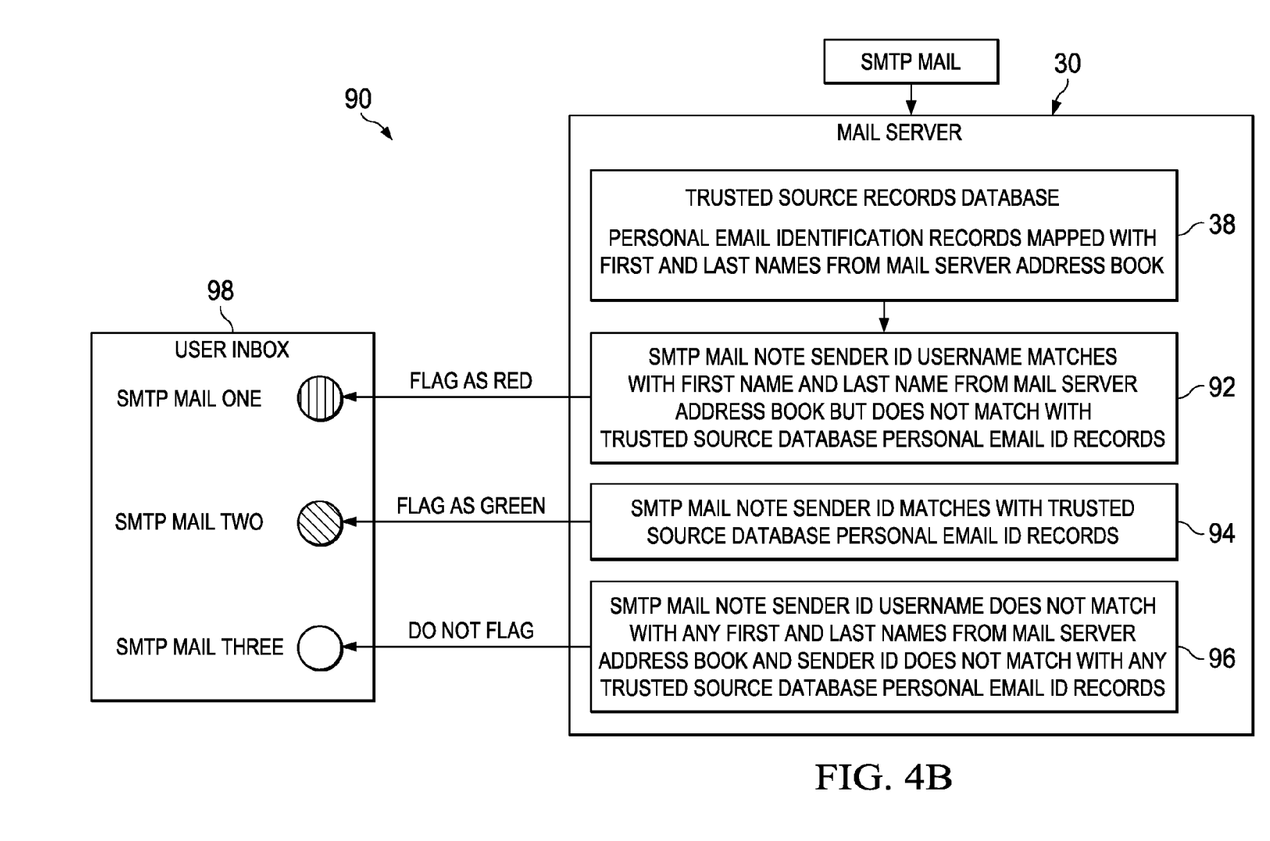
FIG. 4B is a simplified block diagram illustrating a logical representation of one embodiment associated with the flowchart of FIG. 4A in accordance with the present disclosure.

FIGS. 4A and 4B illustrate a simplified flowchart 80 of another process associated with one implementation for monitoring social engineering in a computer network environment. The process involves monitoring a company's incoming email messages in order to identify email messages with a sender email ID username that includes an employee's name, to determine whether such sender email IDs have been authenticated, and to flag the incoming email messages accordingly. The process may be implemented in mail server 30 as shown in FIG. 1, or in any other suitable architecture. Monitoring rules element 32 in mail server 30 may be configured to perform the process shown in FIG. 4A.

The process of flowchart 80 may begin at step 82, where mail server 30 receives incoming email messages. Incoming email messages may include any email messages being sent from a sender email ID that is not within the company network (e.g., email ID that is not stored in mail server address book 36) to an official company email ID (e.g., email ID that is stored in mail server address book 36). After mail server 30 receives an incoming email message, a query is made at operation 84, of whether the sender email ID matches a personal email ID entry in TSRD 38. If the sender email ID matches a personal email ID entry, then the incoming email message is tagged with a trusted source flag in operation 85, because the sender email ID was previously authenticated and has a mapping email entry in TSRD 38. If, however, the sender email ID does not match any personal email IDs in TSRD 38, then a comparison process is performed and a query is made at operation 86 to determine if the sender email ID username matches a name record in mail server address book 36. If the sender email ID username does not match any name record in mail server address book 36, then the incoming email message is not flagged in operation 88 and the process ends, because the sender email ID does not appear to be a personal email ID belonging to a person within the company network. However, if the sender email ID username matches a name record in mail server address book 36, then the email message is tagged with a high-alert flag in operation 87 because the sender email ID has not been authenticated and may appear to be a personal email ID of someone within the company network. After the email message has been flagged appropriately in either operation 87 or 88, the process ends. It will be appreciated that the comparison process to compare the sender email ID username to the name record from mail server address book 36 could be implemented in the same or similar manner as the comparison process previously described herein. It will also be appreciated that process 80 could be configured to manage incoming email messages in any other desired way. For example, email messages tagged with a high-alert flag could be automatically deleted, rerouted to appropriate mail folders, or otherwise handled.

FIG. 4B represents a diagram illustrating an example logical representation 90 of one embodiment associated with the flowchart of FIG. 4A. In FIG. 4B, Simple Mail Transfer Protocol (SMTP) mail is received by mail server 30. SMTP mail is electronic mail that conforms to an Internet standard for transmission across Internet Protocol (IP) networks. The SMTP mail received by mail server 30 may be mail received from an IP network, as described with reference to network 12 shown in FIG. 1. TSRD 38 is depicted as integrated in mail server 30, however, as previously shown, TSRD 38 may be a separate database operably connected to mail server 30. TSRD 38 includes personal email identification records mapped with first and last names from mail server address book.

In FIG. 4B, three possible flagging conditions are shown for every SMTP mail message received by mail server 30 from an IP network. Specifically, a tag may be added to a SMTP mail note depending upon which condition is met. The SMTP mail note will be displayed in a user inbox 98 with the flag indicating which condition has been met, thus giving the user important information about the source of the SMTP mail note. For a flagging condition 92 where a SMTP mail note sender ID username matches with some combination of a first and last name from mail server address book 36 but does not match with TSRD 38 personal email ID records, the mail note may be tagged with a "red" flag, which may then be viewable in user inbox 98. The "red" flag corresponds to mail flagged as a high alert because the sender ID has not been authenticated and thereby included in TSRD 38. In addition, when a "red" flag is added, a message may also be displayed for the user, such as, for example: "The sender ID of this message does not match with our Trusted Source Records. Please call to confirm the sender ID is legitimate." For a flagging condition 94 where a SMTP mail note sender ID matches with TSRD 38 personal email ID records, the SMTP mail note may be tagged with a "green" flag and may then be viewable in user inbox 98. The "green" flag corresponds to mail flagged as a trusted source because the sender ID has been authenticated and TSRD 38 has been updated with a mapping email entry. For a flagging condition 96 where a SMTP mail note sender ID username does not match with any first and last names from mail server address book 36 and sender ID does not match with any TSRD 38 personal email ID records, the SMTP mail note may be left unflagged. The unflagged SMTP mail note corresponds to email that does not appear to come from an employee of the company because no employees names are provided in the sender ID username. It will be apparent that any suitable types of flags and messages displayed may be used to distinguish the particular flagging conditions described herein.

Software for achieving the operations outlined herein can be provided at various locations (e.g., the corporate IT headquarters, the corporate mail server, the network monitor, etc.). In other embodiments, this software could be received or downloaded from a web server (e.g., in the context of purchasing individual end-user licenses for separate networks, devices, servers, network monitors, etc.) in order to provide this system for monitoring social engineering in a computer network environment. In one example implementation, this software is resident in a computer sought to be protected from a security attack (or protected from unwanted or unauthorized manipulations of data).

In other examples, the software of the system for monitoring social engineering in a computer network environment could involve a proprietary element (e.g., as part of a network email security solution such as, for example McAfee® GroupShield® products), which could be provided in (or be proximate to) these identified elements, or be provided in any other device, server, network appliance, console, firewall, switch, information technology (IT) device, network monitor, etc., or be provided as a complementary solution (e.g., in conjunction with a firewall), or provisioned somewhere in the network. As used herein in this Specification, the term 'computer' is meant to encompass these possible elements (network appliances, routers, switches, gateways, processors, servers, load balancers, firewalls, network monitors, or any other suitable device, component, element, or object) operable to affect or process electronic information in a security environment. Moreover, this computer may include any suitable hardware, software, components, modules, interfaces, or objects that facilitate the operations thereof. This may be inclusive of appropriate algorithms and communication protocols that allow for the effective protection of data. In addition, the system for monitoring social engineering can be consolidated in any suitable manner. Along similar design alternatives, any of the illustrated modules, components, and elements of FIG. 1 may be combined in various possible configurations, all of which are clearly within the broad scope of this Specification.

In certain example implementations, the system for monitoring social engineering outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processors (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)) or an ASIC that includes digital logic, software, code, electronic instructions, or any suitable combination thereof.

Any of these elements (e.g., a computer, a server, a network appliance, a firewall, a network monitor, etc.) can include memory elements for storing information to be used in achieving the system for monitoring social engineering as outlined herein. Additionally, each of these devices may include a processor that can execute software or an algorithm to perform the monitoring activities as discussed in this Specification. These devices may further keep information in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein (e.g., TSRD, mail server address book, memory element, etc.) should be construed as being encompassed within the broad term 'memory element.' Similarly, any of the potential processing elements, modules, and machines described in this Specification should be construed as being encompassed within the broad term 'processor.' Each of the computers, network appliances, servers, network monitors, etc. can also include suitable interfaces for receiving, transmitting, and/or otherwise communicating data or information in a secure environment.

Note that with the examples provided herein, interaction may be described in terms of two, three, four, or more network components. However, this has been done for purposes of clarity and example only. It will be appreciated by those skilled in the art that network monitor 40, mail server 30, mail server address book 36, and TSRD 38 may be independently configured and interconnected or, alternatively, may be integrated into one or more network components. In certain cases, it may be easier to describe one or more of the functionalities of a given set of flows by only referencing a limited number of components or network elements. It should be appreciated that the system of FIG. 1 (and its teachings) is readily scalable. System 20 can accommodate a large number of components, as well as more complicated or sophisticated arrangements and configurations. Accordingly, the examples provided should not limit the scope or inhibit the broad teachings of system 20 as potentially applied to a myriad of other architectures.

It is also important to note that the operations described with reference to the preceding FIGURES illustrate only some of the possible scenarios that may be executed by, or within, system 20. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by system 20 in that any suitable arrangements, chronologies, configurations, and timing mechanisms may be provided without departing from the teachings of the discussed concepts.

What is claimed is:

1. A method, comprising:
providing a memory component with one or more alternative email entries associated with a plurality of name records representing one or more authorized users of a network;
identifying a recipient email address in an outgoing email message from the network if a username of the recipient email address includes an identifiable portion of one of the plurality of name records, wherein the outgoing email message is being sent to the recipient email address from one of a plurality of official email addresses associated with the network, and wherein the identifiable portion of the one of the name records includes at least a first character of a first name and at least the smaller one of a last name and a first five characters of the last name;
populating the memory component with a new alternative email entry corresponding to the identified recipient email address;
determining whether any of the one or more alternative email entries corresponds to a sender email address in an incoming email message being sent from the sender email address to at least one of the plurality of official email addresses associated with the network;
identifying the sender email address if a username of the sender email address includes another identifiable portion of one of the plurality of name records; and
tagging the incoming email message with a flag if none of the one or more alternative email entries corresponds to the identified sender email address.

2. The method of claim 1, further comprising:
tagging the incoming email message with a different flag if any of the one or more alternative email entries in the memory component corresponds to the sender email address.

3. The method of claim 1, wherein a plurality of the alternative email entries is associated with one of the name records.

4. The method of claim 1,
wherein each of the plurality of official email addresses is associated with at least one of the name records, and
wherein the memory component will be populated with the new alternative email entry only if the official email address sending the outgoing email message is associated with the one of the plurality of name records with the identifiable portion included in the username of the recipient email address.

5. The method of claim 1, wherein if the memory component contains an existing alternative email entry corresponding to the recipient email address then the memory component is not populated with the new alternative email entry.

6. The method of claim 1, further comprising:
mapping the new alternative email entry to a tracking entry corresponding to the official email address sending the outgoing email message.

7. Logic encoded in one or more tangible, non-transitory media that includes code for execution and when executed by one or more processors is operable to perform operations comprising:
providing a memory component with one or more alternative email entries associated with a plurality of name records representing one or more authorized users of a network, and wherein the identifiable portion of the one of the name records includes at least a first character of a first name and at least the smaller one of a last name and a first five characters of the last name;

identifying a recipient email address in an outgoing email message from the network if a username of the recipient email address includes an identifiable portion of one of the plurality of name records, wherein the outgoing email message is being sent to the recipient email address from one of a plurality of official email addresses associated with the network;

populating the memory component with a new alternative email entry corresponding to the identified recipient email address; and determining whether any of the one or more alternative email entries corresponds to a sender email address in an incoming email message being sent from the sender email address to at least one of the plurality of official email addresses associated with the network;

identifying the sender email address if a username of the sender email address includes another identifiable portion of one of the plurality of name records; and tagging the incoming email message with a flag if none of the one or more alternative email entries corresponds to the identified sender email address.

8. The logic of claim 7, the one or more processors being operable to perform operations further comprising:

tagging the incoming email message with a different flag if any of the one or more alternative email entries in the memory component corresponds to the sender email address.

9. The logic of claim 7, wherein each of the plurality of official email addresses is associated with at least one of the name records, and wherein the memory component will be populated with the new alternative email entry only if the official email address sending the outgoing email message is associated with the one of the plurality of name records with the identifiable portion included in the username of the recipient email address.

10. The logic of claim 7, further comprising:

mapping the new alternative email entry to a tracking entry corresponding to the official email address sending the outgoing email message.

11. An apparatus, comprising:

a memory component including one or more alternative email entries associated with a plurality of name records representing one or more authorized users of a network; and one or more processors operable to execute instructions for monitoring social engineering in a network, including:

identifying a recipient email address in an outgoing email message from the network if a username of the recipient email address includes an identifiable portion of one of the plurality of name records, wherein the outgoing email message is being sent to the recipient email address from one of a plurality of official email addresses associated with the network, and wherein the identifiable portion of the one of the name records includes at least a first character of a first name and at least the smaller one of a last name and a first five characters of the last name;

populating the memory component with a new alternative email entry corresponding to the identified recipient email address; and determining whether any of the one or more alternative email entries corresponds to a sender email address in an incoming email message being sent from the sender email address to at least one of the plurality of official email addresses associated with the network;

identifying the sender email address if a username of the sender email address includes another identifiable portion of one of the plurality of name records; and tagging the incoming email message with a flag if none of the one or more alternative email entries corresponds to the identified sender email address.

12. The apparatus of claim 11, wherein the one or more processors are operable to execute instructions further comprising:

tagging the incoming email message with a different flag if any of the one or more alternative email entries in the memory component corresponds to the sender email address.

13. The apparatus of claim 11, wherein each of the plurality of official email addresses is associated with at least one of the name records, and wherein the memory component will be populated with the new alternative email entry only if the official email address sending the outgoing email message is associated with the one of the plurality of name records with the identifiable portion included in the username of the recipient email address.

14. The apparatus of claim 11, wherein the one or more processors are operable to execute instructions further comprising:

mapping the new alternative email entry to a tracking entry corresponding to the official email address sending the outgoing email message.

* * * * *